US008830043B2

(12) United States Patent
Sato

(10) Patent No.: US 8,830,043 B2
(45) Date of Patent: Sep. 9, 2014

(54) VEHICLE INSTRUMENT

(75) Inventor: Masayuki Sato, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 87 days.

(21) Appl. No.: 13/477,285

(22) Filed: May 22, 2012

(65) Prior Publication Data

US 2012/0306635 A1  Dec. 6, 2012

(30) Foreign Application Priority Data

Jun. 2, 2011 (JP) ................................. 2011-124351

(51) Int. Cl.
B60Q 1/00 (2006.01)
B60Q 3/04 (2006.01)
B60K 37/02 (2006.01)

(52) U.S. Cl.
CPC ......... B60Q 3/042 (2013.01); B60K 2350/2065 (2013.01); B60K 2350/206 (2013.01); B60K 2350/1092 (2013.01); B60K 2350/2052 (2013.01); B60K 2350/2056 (2013.01); B60K 37/02 (2013.01)
USPC ....................................... 340/425.5

(58) Field of Classification Search
CPC ......... B60K 35/00; B60K 37/00; B60K 37/02
USPC ................. 340/425.5, 426.15; 353/13, 14
See application file for complete search history.

(56) References Cited

U.S. PATENT DOCUMENTS

2006/0092098 A1* 5/2006 Yokota et al. ................. 345/33
2008/0158510 A1* 7/2008 Tant et al. ..................... 353/14
2010/0305805 A1* 12/2010 Yamaguchi .................. 701/29
2011/0090074 A1* 4/2011 Kuno et al. ................. 340/438

FOREIGN PATENT DOCUMENTS

| JP | 11-245687 A | 9/1999 |
| JP | 2002-079848 A | 3/2002 |
| JP | 2007-041404 A | 2/2007 |
| JP | 2009-128308 A | 6/2009 |
| JP | 2011-073588 A | 4/2011 |

OTHER PUBLICATIONS

Japanese Office Action dated Mar. 5, 2013, issued in corresponding Japanese Patent Application No. 2011-124351 (3 pages).

* cited by examiner

Primary Examiner — Hai Phan
Assistant Examiner — Zhen Y Wu
(74) Attorney, Agent, or Firm — Westerman, Hattori, Daniels & Adrian, LLP

(57) ABSTRACT

A vehicle instrument includes a mechanical meter which is attached to an instrument panel of a vehicle, and a projector which projects an image to be superimposed on an indication area of the mechanical meter. The projector projects a graphic image according to the type of display content. In the case where the display content is a warning, a warning image is superimposed on an indicator and the area surrounding the indicator of the mechanical meter. The projector can also superimpose an area image on the display area of the mechanical meter, the area image indicating a cost effective driving range according to a driving state of the vehicle.

7 Claims, 6 Drawing Sheets

VEHICLE INSTRUMENT

CROSS REFERENCES TO RELATED APPLICATIONS

The present application claims priority under 35 U.S.C. §119 to Japanese Patent Application No. 2011-124351, filed Jun. 2, 2011, entitled "Vehicle Instrument." The contents of this application are incorporated herein by reference in their entirety.

TECHNICAL FIELD

The present embodiment relates to a vehicle instrument.

BACKGROUND OF THE INVENTION

Conventionally, there has been known a display instrument (for example, see Japanese Unexamined Patent Application Publication No. 11-245687) which includes, for example, a mechanical meter having a linear mark (an indicator) on a rotationally driven transparent disk, the linear mark emitting light in response to light from a light source; and a liquid crystal display disposed behind the transparent disk, the liquid crystal display being visually recognizable through the transparent disk, thereby achieving a superimposed display which allows the linear mark of the mechanical meter to indicate a position on a predetermined scale of the liquid crystal display. In addition, conventionally, a meter unit has been known (for example, see Japanese Unexamined Patent Application Publication No. 2009-128308) which displays a digital meter inside an analog indicator meter, for example, when the analog indicator meter image and the digital meter image are displayed on the same display screen.

SUMMARY OF THE INVENTION

The display instrument according to the above-described related art has a configuration in which the linear mark provided on the surface of the transparent disk, and the scale design of the liquid crystal display disposed behind the transparent disk are superimposed and displayed. However, because the linear mark is only formed on the surface of the transparent disk, the thickness of the transparent disk is not recognized as part of the indicator, and furthermore, a space is provided between the transparent disk and the scale design of the liquid crystal display as necessary, and because of the spaced-apart arrangement of the two objects to be superimposed and displayed (i.e. the linear mark and the scale design), a displacement of the superimposed objects tends to occur depending on the direction of the line of sight, thus causing a problem of reduced visibility.

A displacement in this manner occurs of the two objects to be superimposed and displayed depending on the direction of the line of sight. In the meter unit according to the above-described related art, the analog indicator meter image and the digital meter image are displayed on a single display screen, and thus a displacement of the superimposed objects depending on the direction of the line of sight can be prevented. However, in the meter unit according to the above-described related art, the single display screen on which the analog indicator meter image and the digital meter image are displayed is a plane, and thus a stereoscopic feeling of the display is not obtained, which causes a problem in that marketability of the meter unit is reduced. In addition, even when the display is uniform in brightness and is presented, for example, in black, a portion which does not form the design (in-between space) also emits light because the backlight cannot be completely blocked, and thus the superimposed display is not significantly noticeable, which causes a problem of reduced visibility.

A vehicle instrument is provided which can prevent a displacement in the superimposed display depending on the direction of the line of sight, and can secure stereoscopic feeling of the display and improve the appearance of the display.

A vehicle instrument according to a first aspect of the embodiment includes: a mechanical meter (for example, a mechanical meter 12 in the embodiment) which is disposed so as to be visually recognized by a driver seated on a driver's seat of a vehicle, and has an indication area (for example, an indication area 21 in the embodiment) and an indicator (for example, an indicator 23 in the embodiment) for indicating part of the indication area; and a projector (for example, a projector 13 in the embodiment) configured to project an image to be superimposed on the indication area. Consequently, for the two objects to be superimposed and displayed, i.e., the indication area of the mechanical meter and the image projected from the projector, a displacement of the superimposed objects depending on the direction of the line of sight can be prevented. Furthermore, a stereoscopic feeling of the display can be secured by the mechanical meter having a three dimensional contour, and by projecting an image from the projector, the amount of information in the display is increased, while a stereoscopic feeling and the appearance of the display can be improved.

In addition, in a vehicle instrument according to a second aspect of the embodiment, the projector is configured to project the image of a graphic corresponding to a type of display content, and in the case where the display content is a warning, the projector projects the image so as to be superimposed on the indicator and/or the indication area around the indicator. Consequently, the warning can be effectively presented.

In addition, a vehicle instrument according to a third aspect of the embodiment, the indication area includes a scale display area (for example, a scale display area 31 in the embodiment) for displaying a scale to be indicated by the indicator, and wherein when the vehicle is in an eco-driving state, and the projector projects an image indicating the eco-driving range so as to be superimposed on the scale display area. Consequently, the driver is properly encouraged to adopt a cost effective driving. Furthermore, in the eco-driving range indicating a cost effective driving state, a sudden acceleration and driving with an excessive speed are suppressed, and thus driving safety can be improved.

Further, in a vehicle instrument according to a fourth aspect of the embodiment, the indication area is formed as a dial (for example, a dial 22 in the embodiment) of the mechanical meter, the dial has a three dimensional contour with projections and depressions in cross section in the direction of the line of sight from the driver, and the projector projects an image in the background color so as to be superimposed on the dial. Consequently, a stereoscopic feeling and the appearance of the display can be improved.

Furthermore, in a vehicle instrument according to a fifth aspect of the embodiment, the projector is configured to be able to project the image on a part other than the indication area of the mechanical meter, the type of display content of the image that is projected from the projector is differentiated between the indication area and the part other than the indication area. Additionally, and the display surface of the image in the indication area and the display surface of the image in the part other than the indication area are formed with different materials. Consequently, a stereoscopic feeling, raw material appearance, and the appearance of the display can be improved, and thus allowing a viewer to accurately recognize the display content.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
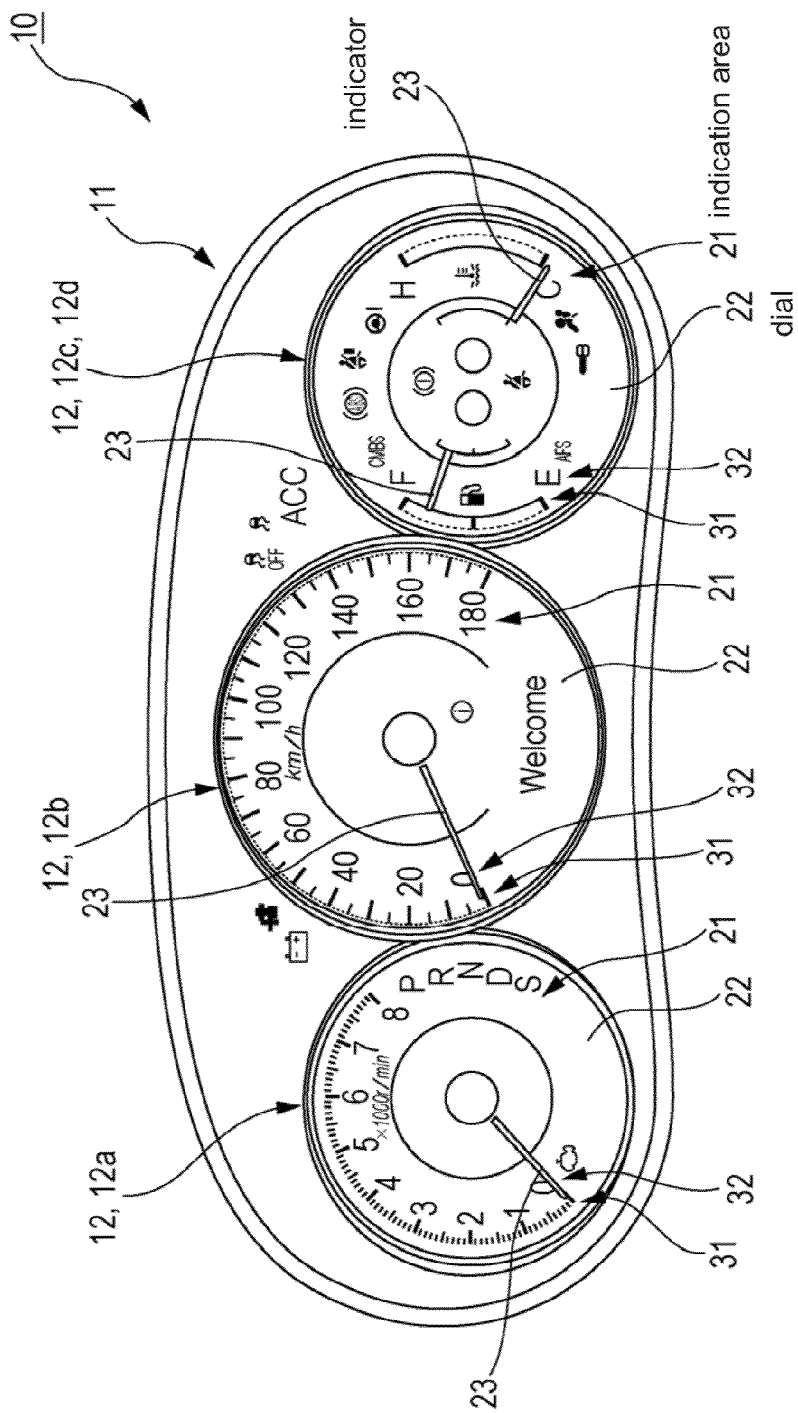
FIG. 1 is a front view from a seat of a vehicle instrument according to an embodiment of the present disclosure.
Figure 2:
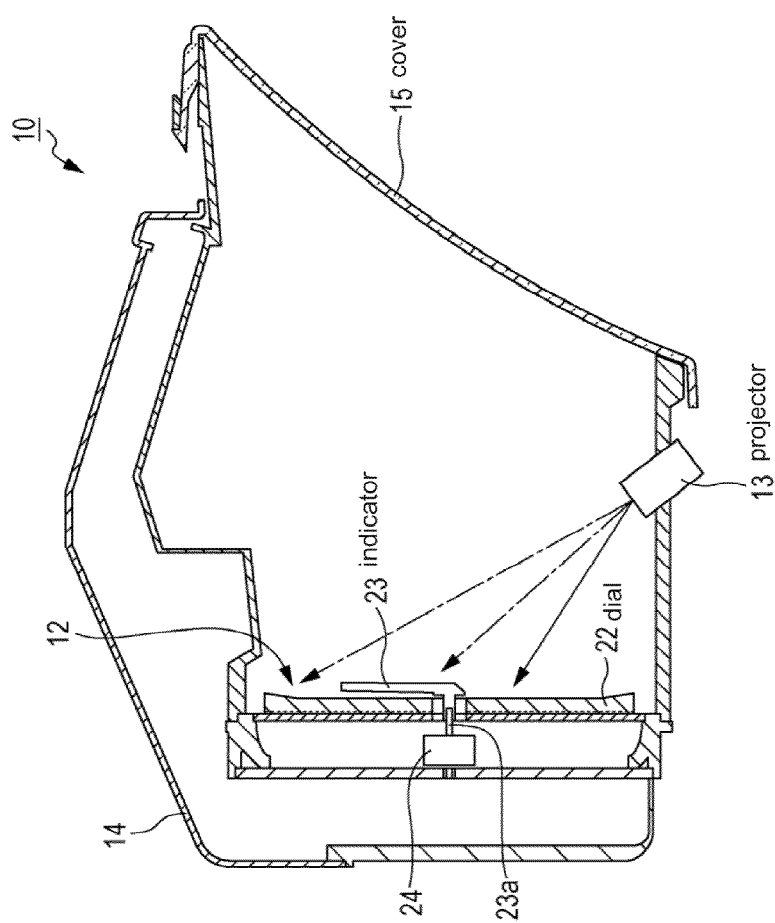
FIG. 2 is a cross-sectional view of a vehicle instrument according to an embodiment of the present disclosure.

Hereinafter, a vehicle instrument according to an embodiment of the present disclosure will be described with reference to the accompanying drawings. A vehicle instrument 10 according to the present embodiment is attached to, for example, an instrument panel 11 disposed in front of a seat (not shown) of a vehicle, and includes, for example, mechanical meters 12 (a tachometer 12a, a speed meter 12b, a residual fuel meter 12c, and a water temperature meter 12d) for displaying the number of revolutions of the engine, the speed, the residual fuel quantity, the engine water temperature of the vehicle, respectively, as illustrated in FIG. 1. In addition, as illustrated in FIG. 2, the vehicle instrument 10 includes, for example, a projector 13 which projects an image to be superimposed on a corresponding part of the mechanical meters 12 (12a to 12d).

The mechanical meters 12 and the projector 13 are housed, for example, in a housing 14 which can be attached to the instrument panel 11 of the vehicle, and an opening of the housing 14, which can be opened in front of the seat, is sealed by a cover 15.

Each mechanical meter 12 is disposed so as to be visually recognized by a driver seated in a driver's seat (not shown) of a vehicle, for example, and includes a dial 22 forming an indication area 21 having a scale and characters, an indicator 23 for indicating part of the indication area 21, and an actuator 24 for rotationally driving the indicator 23.

The dial 22 is formed in a disk-like shape, for example, and has a three dimensional contour with projections and depressions in cross section in the direction of the line of sight from the driver. The dial 22 includes a scale display area 31 having a scale arranged in the outer circumferential portion in the circumferential direction, and a character display portion 32 having characters (such as alphanumeric characters) arranged radially inwardly of the scale display area 31 in the circumferential direction. Each of the display units 31, 32 is an object that is to be indicated by the distal end of the indicator 23 which moves along a circular orbit as the indicator 23 rotates.

The indicator 23 includes a rotatable shall 23a which is rotationally driven by the actuator 24, and is configured to rotate about the rotatable shaft 23a at a position nearer to the seat than the dial 22 (i.e., a position displaced toward the front side of the seat) so that a point in the scale display area 31 and the character display portion 32 of the dial 22 is indicated.

The projector 13 is disposed, for example, at a position nearer to the front side of the seat of the vehicle than the mechanical meters 12, in the vertically lower direction of the housing 14, and is configured to project a graphic image 41a, 41b, 41c according to a type of display content among various types on the surface of the relevant mechanical meter 12 (i.e., the surface near the front side of the seat of the vehicle) so that an image reflected on the surface is visually recognized by the driver.

Figure 3:
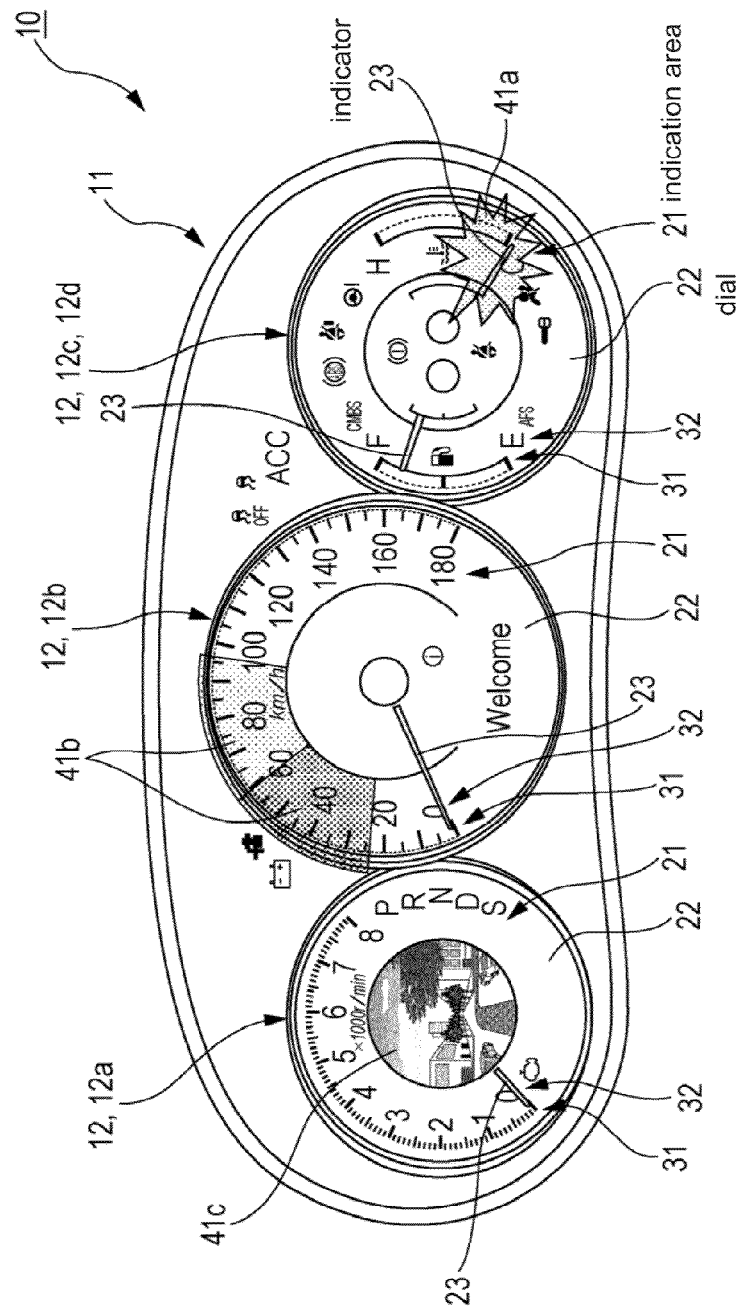
FIG. 3 is a front view from a seat of a vehicle instrument according to an embodiment of the present disclosure.

For example, as illustrated in FIG. 3, in the case where the display content projected from the projector 13 is a warning, a graphic warning image 41a having a predetermined shape is superimposed on the indicator 23 of each mechanical meter 12 or around the indicator 23 in the indication area 21.

For example, in the case where the number of revolutions of the engine or the vehicle speed exceeds a predetermined upper limit on the tachometer 12a or the speed meter 12b, the warning image 41a is displayed at a position indicating the upper limit. In the case where the residual fuel quantity is less than a predetermined quantity near zero in the residual fuel meter 12c, the warning image 41a is displayed at a position indicating the predetermined quantity. In the case where the engine water temperature is higher or lower than a predetermined temperature range on the water temperature meter 12d, the warning image 41a is displayed at a position on the corresponding boundary of the temperature range.

The scale display area 31 of each mechanical meter 12 (for example, the tachometer 12a, the speed meter 12b) has an eco-driving range (i.e., cost effective driving range) such that when the indicator 23 indicates the eco-driving range, the vehicle is in an eco-driving state (i.e., cost effective driving state indicating a driving state which is cost effective). As illustrated in FIG. 3, for example, the projector 13 superimposes an area image 41b of a graphic having a predetermined shape on the scale display area 31, the area image 41b indicating an eco-driving range of the scale display area 31 of each mechanical meter 12 (for example, the tachometer 12a, the speed meter 12b). The area image 41b is, for example, a sector figure among a plurality of sectors obtained by dividing a scale arranged in the outer circumferential portion of the dial 22 in the circumferential direction, in accordance with a degree of cost effective driving.

As illustrated in FIG. 3, for example, the projector 13 also superimposes a camera image or a map image 41c of a navigation device (not shown) on a part other than the indication area 21 of the mechanical meter 12, the camera image being obtained with a camera (not shown) by capturing an image of an outside area such as both sides or the rear side of the vehicle which are the driver's blind spots.

For example, in the case where the dial 22 has a surface (i.e., the surface near the front side of the seat of the vehicle) having any of various of three-dimensional contours such as a bowl-like tapered surface, a curved surface, or a spherical surface, the projector 13 superimposes an image in a predetermined background color with uniform brightness and/or hue on the surface, thereby presenting a gradation display which is visually recognized in such a manner that the brightness and/or hue gradually vary depending on the three-dimensional contour of the surface.

For example, in the case where the dial 22 has a planar surface (i.e., the surface near the front side of the seat of the vehicle), the projector 13 presents a gradation display by superimposing an image in a predetermined background color on the surface, the image having gradually varying brightness and/or hue.

As described above, in the vehicle instrument 10 according to the present embodiment, an image projected from the projector 13 is superimposed on the indication area 21 of the mechanical meter 12 having a three-dimensional contour, and thus a displacement of the superimposed objects depending on the direction of the line of sight can be prevented for the two objects to be superimposed and displayed, i.e., the indication area 21 of the mechanical meter 12 and the image projected from the projector 13. Furthermore, a stereoscopic feeling of the display can be secured by the mechanical meter 12 having a three dimensional contour, and by projecting an image from the projector 13, the amount of information in the display is increased, while stereoscopic feeling and the appearance of the display can be improved.

In addition, in the case where the display content projected from the projector 13 is a warning, by superimposing the warning image 41a on the indicator 23 or the area surrounding the indicator 23 of the mechanical meter 12 to which the driver pays close attention, the warning can be effectively presented.

Further, the area image 41b is superimposed on the scale display area 31 of the mechanical meter 12, the area image indicating a cost effective driving range according to a driving state of the vehicle, and thus the driver is properly encouraged to adopt cost effective driving. Furthermore, in the eco-driving range indicating the cost effective driving state, sudden acceleration and driving with an excessive speed are suppressed, and thus driving safety can be improved.

Furthermore, by superimposing an image in the background color on the dial 22 having a three-dimensional contour surface, stereoscopic feeling and the appearance of the display can be improved.

In the embodiment described above, the projector 13 is disposed at a position nearer to the front side of the seat of the vehicle than the mechanical meters 12, however, without being limited to this case, the projector 13 may be disposed, for example, behind the mechanical meters 12 each having a light transparency so as to project a graphic image 41 according to a type of display content among various types on the rear surface of the relevant mechanical meter 12 (i.e., the rear surface near the front side of the vehicle) so that an image passing through each mechanical meter 12 is visually recognized by the driver.

In the embodiment described above, the projector 13 may be configured to be able to project an image on a region other than the indication area 21 of each mechanical meter 12. In this case, different types of display content of the image are projected from the projector 13 in the indication area 21 and a part other than the indication area 21, and the image display surface in the indication area 21, and the image display surface in a part other than the indication area 21 may be formed of different materials. The different materials include, for example, materials having different raw material appearance, materials having different reflection characteristics such as reflectance, or reflection directivity for the light projected from the projector 13, and materials having different transmission characteristics such as transmittance, or transmission directivity for the light projected from the projector 13.

Figure 4:
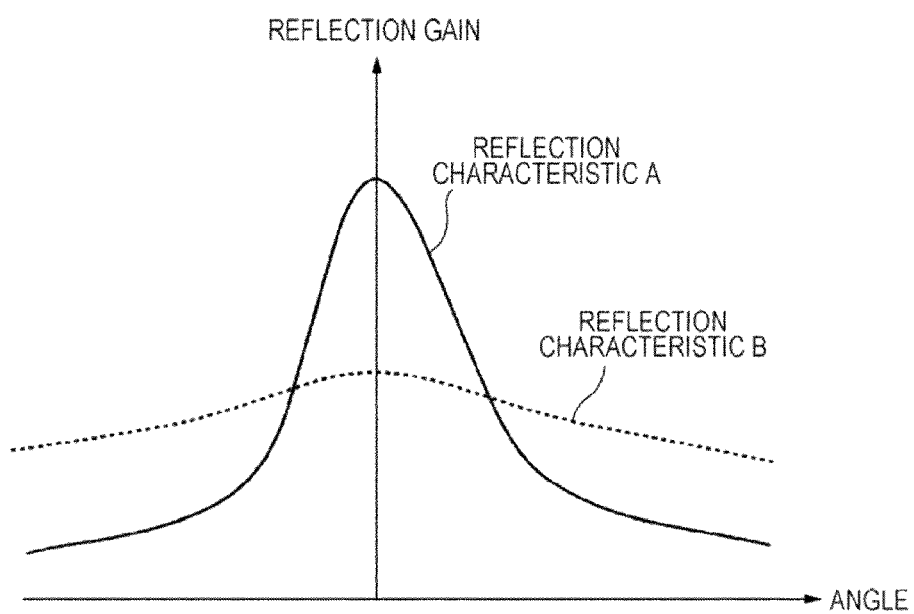
FIG. 4 is a diagram illustrating an example of the reflection characteristics of a mechanical meter of a vehicle instrument according to an embodiment of the present disclosure.

For example, as illustrated in FIG. 4, the indication area 21 of the mechanical meter 12 has a high reflection gain (i.e., reflected image is bright) and is assumed to have reflection characteristics A with a narrow directivity in order to display information necessary only for the driver of the vehicle, while the part other than the indication area 21 of the mechanical meter 12 has a low reflection gain (i.e., reflected image is dark) and is assumed to have reflection characteristics B with a wide directivity in order to provide a display which can be easily visually recognized by other passengers of the vehicle.

For example, in the indication area 21 which presents a display to the driver of the vehicle, the part of the indication area 21 on which an image of display content with high importance such as a warning is projected from the projector 13, may be made of a material with a higher reflectance than other parts, and may be displayed with high brightness.

For example, in a portion other than the indication area 21 of the mechanical meter 12, the part on which a camera image or a map image of a navigation device (not shown) is projected from the projector 13 may be made of a material which allows for a higher definition display than the other parts, the camera image being obtained with a camera (not shown) by capturing an image of an outside area such as both sides or the rear side of the vehicle which are the driver's blind spots.

In this manner, by using different materials at positions at which an image is projected from the projector 13, and by setting the display content of the image so that different types of display content correspond to different materials, stereoscopic feeling, raw material appearance, and the appearance of the display can be improved, thus allowing a viewer to accurately recognize the display content.

In the embodiment described above, each mechanical meter 12 may be provided with a light source which illuminates the indicator 23 from behind where the indicator 23 is light transparent. In addition, a light distribution control member which can control the direction of light may be provided on the surface (i.e., on the surface near the front side of the seat) of the indicator 23. The light distribution control member is formed, for example, by stacking two sheets of optical control films, each optical control film including a plurality of louvers arranged in parallel. The extending directions of the louvers of the stacked two sheets of optical control films are set to cross each other, that is to say, the respective directivities are arranged to be different.

Accordingly, even when the indicator 23 is rotating, the color of the indicator 23 to be visually recognized by a driver of the vehicle can be prevented from changing in response to the projection of the projector 13 when the light projected from the projector 13 is reflected in an unintended direction (for example, in a direction toward the front side of the seat).

Figure 5:
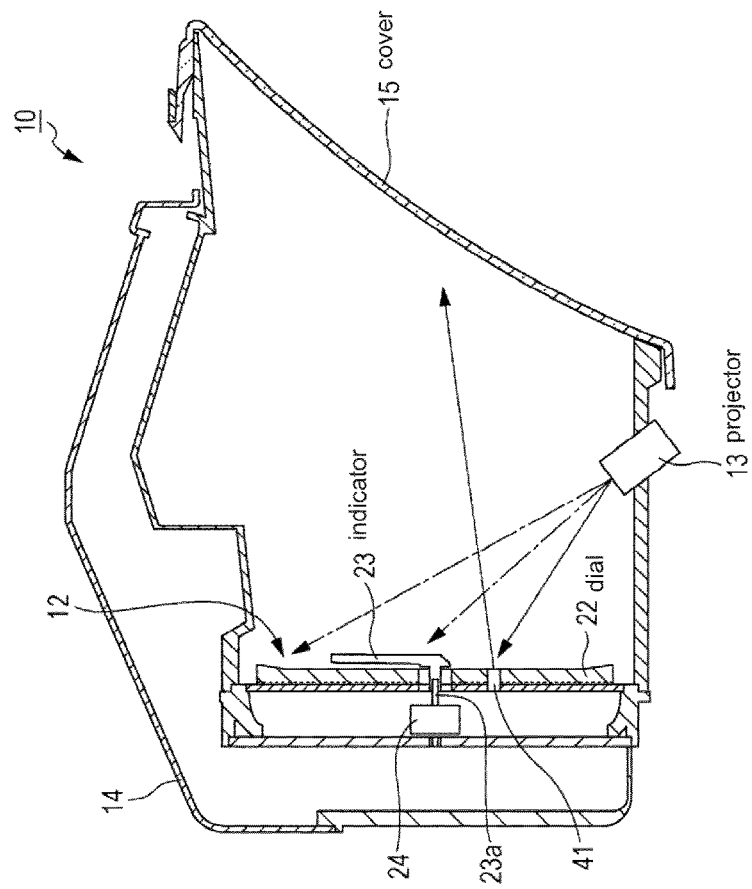
FIG. 5 is a cross-sectional view of a vehicle instrument according to a modification of an embodiment of the present disclosure.

For example, as illustrated in FIG. 5, each mechanical meter 12 may be provided with a light source 41 behind the dial 22, which transparently illuminates a predetermined part of the dial 22 (for example, the part on which an image of display content with high importance such as a warning is projected from the projector 13). Accordingly, highly bright display can be achieved with the light projected from the projector 13 and the transparent illumination by the light source 41, and thus visibility can be improved. Moreover, in contrast with the case where the output of the projector 13 is increased without using the light source 41, for example, an increase in power consumption can be prevented, and thus the life of the projector 13 can be extended. By combining the light source 41 with an optical device such as a transparent material in an arbitrary form, highly bright display can be achieved in an arbitrary form.

Figure 6:
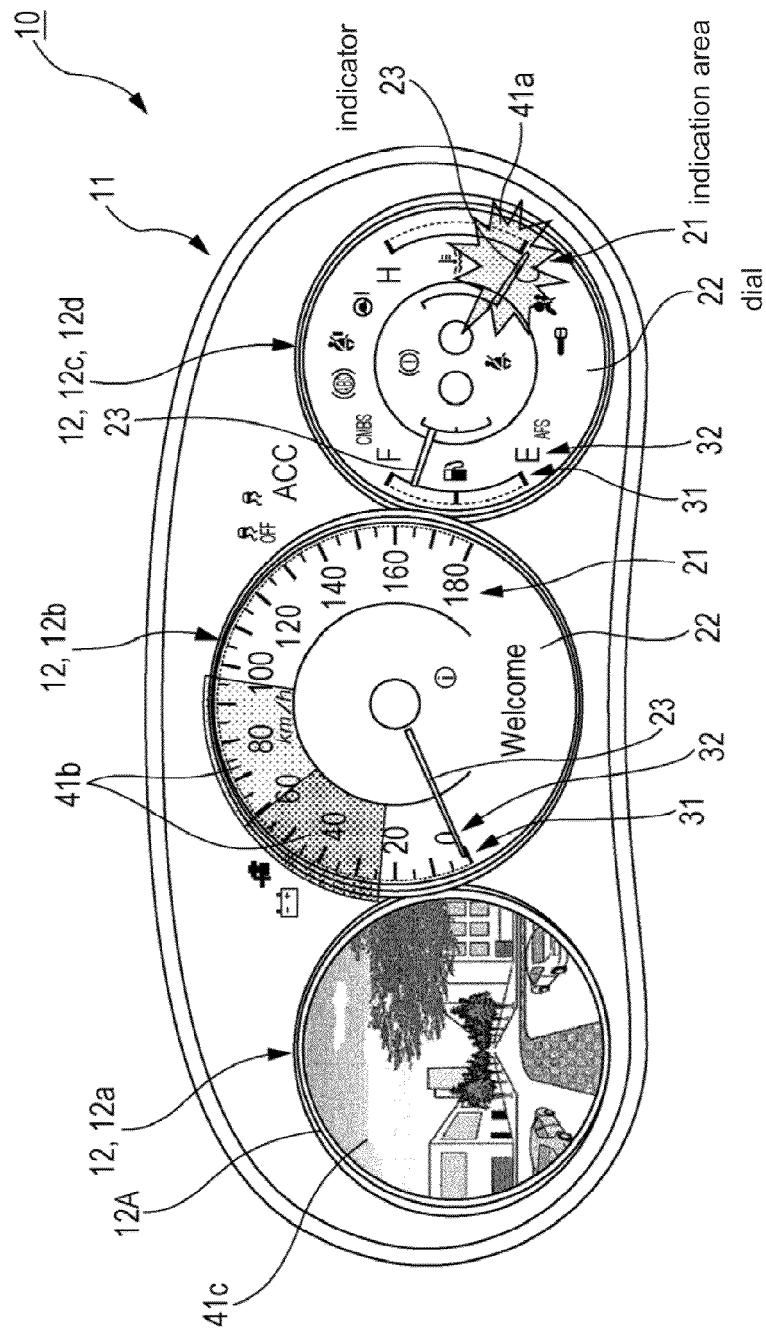
FIG. 6 is a front view from a seat of a vehicle instrument according to a modification of an embodiment of the present disclosure.

In the embodiment described above, the projector 13 projects a camera image captured by a camera (not shown), or the map image 41c of a navigation device (not shown) on a part (for example, the part radially inwardly of the indication area 21 illustrated in FIG. 3) other than the indication area 21 of the mechanical meter 12. However, without being limited to the above case, for example, as illustrated in the modification of FIG. 6, an image may be projected from the projector 13 with the image being switchable so that the image may be superimposed on the entire area of the display surface surrounded by a frame edge portion 12A for a predetermined mechanical meter 12 (for example, the tachometer 12a). For example, for the tachometer 12a, the projector 13 may switch a projection image from an analog display image of the rotational speed to a camera image or the map image 41c as illustrated in FIG. 6, for example, and then project the projection image. Accordingly, the scale provided on the mechanical meter 12 is not superimposed, for example, on the display of the camera image or the map image 41c, and thus the visibility of the images can be prevented from being reduced.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A vehicle instrument, comprising:
   a mechanical meter which is disposed so as to be visually recognized by a driver seated on a driver's seat of a vehicle, the mechanical meter including an indication area having a front surface and an indicator for indicating part of the indication area;
   a projector configured to project an image to be superimposed on the indication area; and
   a housing attached to an instrument panel of the vehicle,
   wherein the housing includes the mechanical meter inside thereof, an opening facing the driver's seat of the vehicle, and a cover covering the opening, and
   wherein the projector is disposed between the mechanical meter and the cover to directly project the image on the front surface of the indication area.

2. The vehicle instrument according to claim 1,
   wherein the image is a graphic corresponding to a type of display content, and
   wherein, when the display content is a warning, the projector projects the image so as to be superimposed on at least one of the indicator and the indication area around the indicator.

3. The vehicle instrument according to claim 1,
   wherein the indication area includes a scale display area having a scale to be indicated by the indicator, and
   wherein when the vehicle is in an eco-driving state, the projector projects an image indicating the eco-driving range so as to be superimposed on the scale display area.

4. The vehicle instrument according to claim 1,
   wherein the indication area is a dial of the mechanical meter,
   wherein, in cross section in a direction of a line of sight from the driver, the dial is contoured to include projections and depressions, and
   wherein the projector projects the image in a background color so as to be superimposed on the dial.

5. The vehicle instrument according to claim 1,
   wherein the projector is capable of projecting the image on a region other than the indication area of the mechanical meter,
   wherein different types of display content are projected from the projector in the indication area and the region other than the indication area, and
   wherein a display surface of the image in the indication area and a display surface of the image in the region other than the indication area are formed of different materials.

6. The vehicle instrument according to claim 1,
   wherein the indication area includes a dial having a front surface, and
   wherein the projector directly projects the image on the front surface of the dial.

7. The vehicle instrument according to claim 1,
   wherein the projector is disposed at a bottom of the housing.

* * * * *